(12) United States Patent
Wall et al.

(10) Patent No.: US 9,708,973 B2
(45) Date of Patent: Jul. 18, 2017

(54) INTEGRATED REFORMER AND WASTE HEAT RECOVERY SYSTEM FOR POWER GENERATION

(71) Applicant: General Electric Company, Schenectady, NY (US)

(72) Inventors: Günther Wall, Bad Häring (AT); Anthony Mark Thompson, Niskayuna, NY (US); Wei Wei, Summit, NJ (US); Gabor Ast, München (DE)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 703 days.

(21) Appl. No.: 13/658,986

(22) Filed: Oct. 24, 2012

(65) Prior Publication Data
US 2014/0109844 A1   Apr. 24, 2014

(51) Int. Cl.
| F01K 23/08 | (2006.01) |
| F02B 43/00 | (2006.01) |
| F01K 23/06 | (2006.01) |
| F01K 25/08 | (2006.01) |
| F02M 21/02 | (2006.01) |
| F02B 63/04 | (2006.01) |

(52) U.S. Cl.
CPC ............ *F02B 43/00* (2013.01); *F01K 23/065* (2013.01); *F01K 25/08* (2013.01); *F02B 63/042* (2013.01); *F02M 21/0227* (2013.01); *F02M 21/0287* (2013.01); *Y02T 10/16* (2013.01); *Y02T 10/166* (2013.01); *Y02T 10/32* (2013.01)

(58) Field of Classification Search
CPC ......... F02B 43/10; F02B 43/00; F02M 27/02; F02M 21/0227; F02M 21/0287; Y02E 20/18; F02C 3/28; F01K 23/065; F01K 25/08
USPC .................................................. 123/3; 60/780
See application file for complete search history.

(56) References Cited

U.S. PATENT DOCUMENTS

| 6,510,695 B1 * | 1/2003 | Fisher ............................. 60/780 |
| 7,059,130 B2 | 6/2006 | Kawamura |
| 7,210,467 B2 | 5/2007 | Kweon et al. |
| 7,850,944 B2 | 12/2010 | Genkin et al. |
| 7,931,712 B2 | 4/2011 | Zubrin et al. |
| 2009/0229239 A1 | 9/2009 | Keller et al. |
| 2010/0263380 A1 | 10/2010 | Biderman et al. |
| 2010/0280135 A1 | 11/2010 | Doty |
| 2010/0291455 A1 | 11/2010 | Biderman et al. |
| 2011/0048012 A1 | 3/2011 | Ernst et al. |
| 2011/0072820 A1 | 3/2011 | Finkenrath et al. |
| 2011/0201699 A1 | 8/2011 | Lucas et al. |
| 2011/0209473 A1 | 9/2011 | Fritz et al. |

* cited by examiner

*Primary Examiner* — Jacob Amick
(74) *Attorney, Agent, or Firm* — John P. Darling

(57) ABSTRACT

A power generation system is provided. The power generation system includes a reformer system for producing syngas for an internal combustion engine. The reformer system includes a reforming unit having a catalyst for thermochemical conversion of a first portion of a hydrocarbon fuel to the syngas. The power generation system also includes a waste heat recovery system including at least one organic Rankine cycle flow path of working fluid, at least one waste heat recovery exchanger, for extracting waste heat from the reformer system, and at least one evaporator for using the extracted waste heat for heating the working fluid.

17 Claims, 3 Drawing Sheets

INTEGRATED REFORMER AND WASTE HEAT RECOVERY SYSTEM FOR POWER GENERATION

BACKGROUND

The invention relates generally to the field of power generation and more particularly to a power generation system utilizing waste heat from a reformer system.

Gas engine plants typically control emissions such as nitrogen oxide (NOx) from the exhaust stream of an internal combustion engine by reforming fuel exhaust gas after treatment. An alternative approach is to limit NOx formation by further increasing the air-fuel ratio of the charge. As such lean mixtures burn unstable, this approach is requiring a fuel with specific combustion behavior which can, for instance, be generated in an upstream fuel reforming process.

A reformer system converts a portion of liquid or gaseous fuels to a synthesis gas (or syngas), usually by a catalytic fuel conversion processes. The syngas is rich in hydrogen and can be further mixed with gaseous fuels to form a hydrogen-rich combustion gas before being fed to the internal combustion engine. This hydrogen-rich combustion gas allows for a stable and lean combustion, thereby reducing $NO_x$ emissions.

The reformer system involves high temperature (exothermal) processes to generate the syngas at elevated temperatures. Generally, before using the syngas in the internal combustion engine, the syngas is required to be cooled to a temperature according to typical interface conditions in the gas engine plant.

Cooling of the syngas in reformer systems leads to waste heat which is conventionally released into the ambient atmosphere.

BRIEF DESCRIPTION

The inventors have determined that there is an ongoing need for integrating the reformer systems with waste heat recovery systems for increasing the overall efficiency of such power generation systems.

In accordance with an embodiment of the invention, a power generation system is provided. The power generation system includes a reformer system for producing syngas for an internal combustion engine. The reformer system includes a reforming unit having a catalyst for thermochemical conversion of a first portion of a hydrocarbon fuel to the syngas. The power generation system also includes a waste heat recovery system including at least one organic Rankine cycle flow path of working fluid, at least one waste heat recovery exchanger for extracting waste heat from the reformer system, and at least one evaporator for using the extracted waste heat for heating the working fluid.

In accordance with another embodiment of the invention, a waste heat recovery system is provided. The waste heat recovery system includes a reformer system comprising at least one waste heat recovery heat exchanger for extracting waste heat located in multiple flow paths of the reformer system. The waste heat recovery system also includes at least one organic Rankine cycle system integrated with the reformer system. The at least one organic Rankine cycle system includes an evaporator configured to at least partially evaporate and/or to superheat a working fluid using the waste heat recovered from the reformer system.

In accordance with another embodiment of the invention, a reformer system is provided. The reformer system includes a reforming unit for producing a syngas for an internal combustion engine. The reforming unit includes a catalyst for thermochemical conversion of a mixture of a first portion of a hydrocarbon fuel along with a flow of steam and a flow of air to the syngas. Furthermore, the reformer system includes one or more waste heat recovery heat exchangers for extracting waste heat located in multiple flow paths of the reformer system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
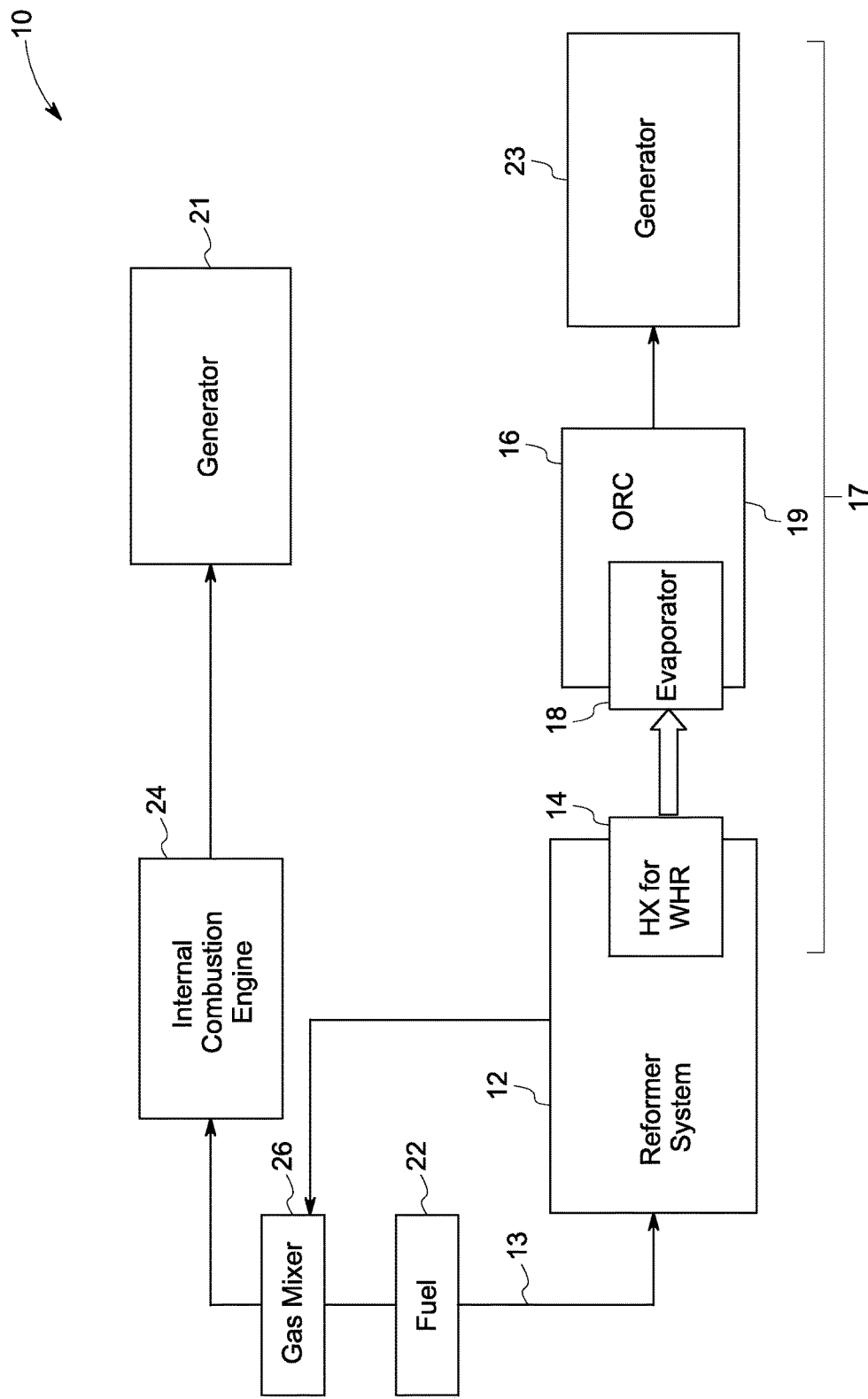
FIG. 1 is a schematic view of a power generation system in accordance with an embodiment of the present invention.

FIG. 1 is a schematic view of a power generation system 10 of a gas engine plant in accordance with an embodiment of the present invention. The power generation system 10 includes a reformer system 12 for producing syngas for an internal combustion engine 24. The reformer system 12 includes a reforming unit (shown as 20 in FIG. 2) having a catalyst for thermochemical conversion of a portion 13 of a hydrocarbon fuel 22 to the syngas. In one embodiment, the hydrocarbon fuel 22 comprises methane or propane or other gaseous hydrocarbon fuels or combinations thereof. The power generation system 10 also includes a waste heat recovery system 17 including at least one organic Rankine cycle flow path 19 of working fluid, at least one waste heat recovery exchanger 14 for extracting waste heat from the reformer system 12, and at least one evaporator 18 for using the extracted waste heat for heating the working fluid. The power generation system shown in FIG. 1 also includes first and second generators 21, 23 for generating electrical power. The first generator 21 is coupled with the internal combustion engine 24 while the second generator 23 is coupled to one or more expanders (shown as 108,122 in FIG. 3 in the waste heat recovery system 17. The expander may comprise a turbine which expands the heated working fluid in the organic Rankine cycle flow path 19 of the waste heat recovery system 17. The waste heat recovery system 17 may include one or more expanders coupled to one or more generators for generating electricity.

Figure 2:
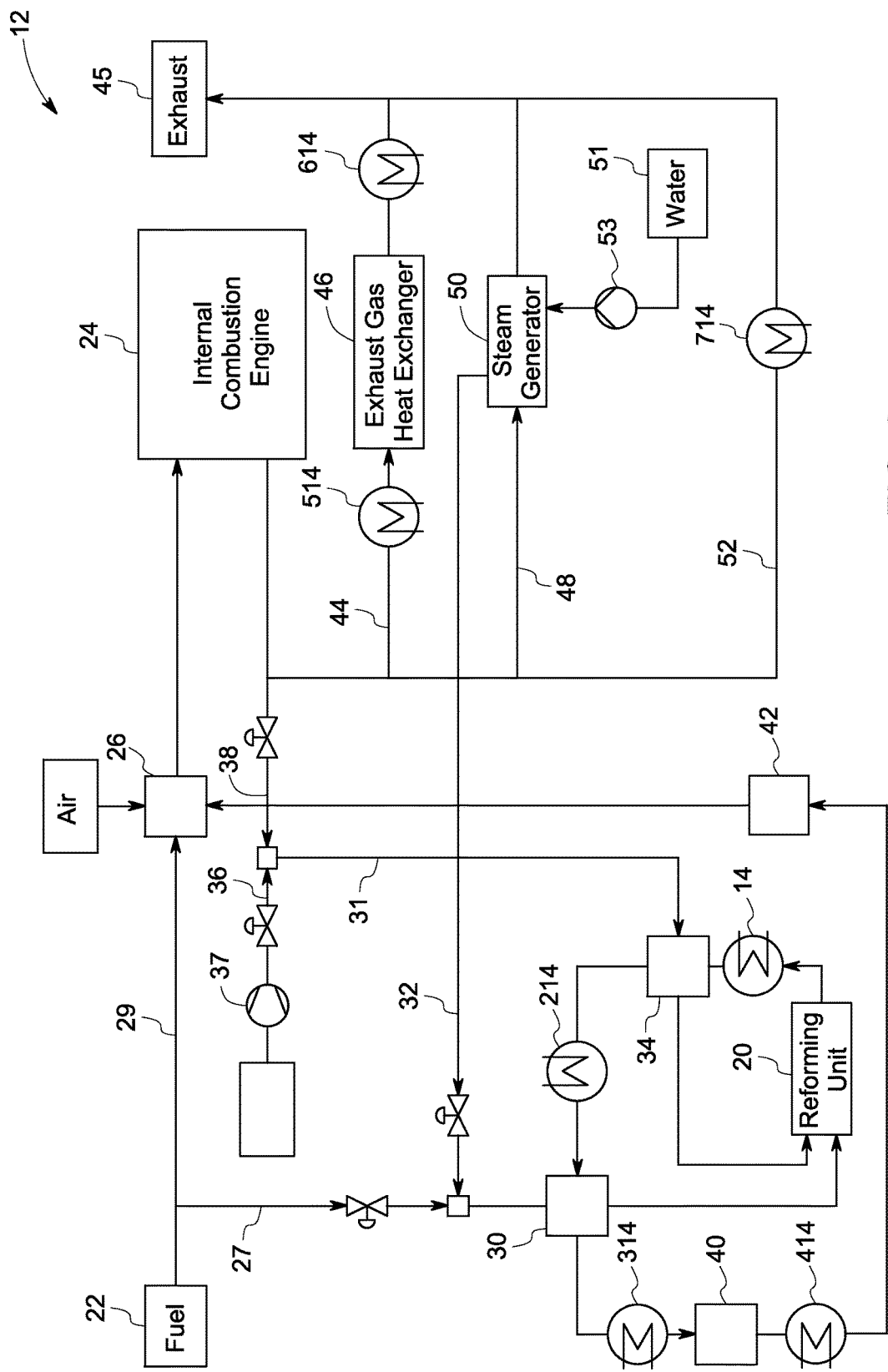
FIG. 2 is a diagrammatical representation of the reformer system in accordance with an embodiment of the present invention.

FIG. 2 is a diagrammatical representation of the reformer system 12 in accordance with an embodiment of the present invention. As shown, the reformer system 12 includes a reforming unit 20 having a catalyst for thermochemical conversion of a mixture of a first portion 27 of a hydrocarbon fuel 22 along with a flow of steam 32 and a mixture of a flow of air 36 and/or a flow of exhaust gases 38 into a syngas. The syngas includes a mixture of carbon monoxide and hydrogen. The reformer system 12 includes a gas mixer unit 26 for supplying the syngas and/or a second portion 29 of the hydrocarbon fuel 22 to the internal combustion engine 24. The syngas along with the second portion 29 of the hydrocarbon fuel 22 are combined together and mixed with air supplied from a source of ambient air in the gas mixer unit 26 before being supplied to the internal combustion engine 24 for reducing the NOx emissions of exhaust gases. The reformer system 12 includes multiple flow lines of the exhaust gases from the internal combustion engine 24.

The reformer system 12 of FIG. 2 also includes a fuel-steam preheating heat exchanger 30 for preheating the first portion 27 of the hydrocarbon fuel 22 and the flow of steam 32 prior to supplying the first portion 27 of the hydrocarbon fuel 22 and the flow of steam 32 to the reforming unit 20. The fuel-steam preheating heat exchanger 30 may preheat the mixture of the first portion 27 of the hydrocarbon fuel 22 and the flow of steam 32 to a temperature of about 500 degrees, for example. The reformer system 12 further includes an air-exhaust preheating heat exchanger 34 for preheating a mixture 31 of the flow of air 36 and the flow of exhaust gas 38 from the internal combustion engine 24 prior to supplying the mixture into the reforming unit 20.

An exothermic reaction takes place in the reforming unit 20 resulting in the production of the syngas at a temperature about 700 degrees Celsius at an output of the reforming unit 20. The syngas at about 700 degree Celsius temperature is passed through the air-exhaust preheating heat exchanger 34 and the fuel-steam preheating heat exchanger 30 for preheating mixtures of air and/or exhaust and fuel and/or steam that is directed into the reforming unit 20. The syngas is cooled in the process of preheating the mixtures of air and/or exhaust and fuel and/or steam and is further cooled in one embodiment using a first syngas cooling stage heat exchanger 40 and a second syngas cooling stage heat exchanger 42 before being supplied to the internal combustion engine 24. In one embodiment, both the first syngas cooling stage heat exchanger 40 and the second syngas cooling stage heat exchanger 42 may utilize a supply of cold fluid such as cold water for cooling the syngas. The flow of air 36 used in the reformer unit 20 is provided from a source of ambient air which is first compressed by a compressor 37. Also, the flow of steam 32 used in the reformer unit 20 may be provided by a steam generator 50. The steam generator 50 may utilize heat from a flow of exhaust gases 48 for converting water to steam. This water may be supplied to the steam generator 50 from a water source 51 using a pump 53. A plurality of control valves may be used for controlling the flow of fuel, steam and compressed air in fluid communication lines of the reformer system 12. Further, the reformer system 12 may include an exhaust gas heat exchanger 46 located in a path of a flow of exhaust gases 44 to an exhaust outlet 45.

The reformer system 12 includes one or more waste heat recovery heat exchangers for extracting waste heat located in multiple flow paths of the reformer system. A number of locations are shown for purposes of example, but not all of these waste heat recovery heat exchangers are required in any one embodiment. One of the waste heat recovery heat exchangers 14 is illustrated as being in fluid communication with a path carrying the syngas between the reforming unit 20 and the air-exhaust preheating heat exchanger 34. Another waste heat recovery heat exchanger 214 is shown in fluid communication with a path carrying the syngas between the air-exhaust preheating heat exchanger 34 and the fuel-steam preheating heat exchanger 30. Yet another, waste heat recovery heat exchangers 314 is in fluid communication with a path between the fuel-steam preheat heat exchanger 30 and the first syngas cooling stage heat exchanger 40, and one waste heat recovery heat exchanger 414 is in fluid communication with a path between the first and second syngas cooling stage heat exchangers (40,42). Moving from the reformer loop to the exhaust loop, another waste heat recovery heat exchanger 514 may be in fluid communication with a path of the flow of exhaust gases 44 between the exhaust gas turbine 28 and the exhaust gas heat exchanger 46 and/or waste heat recovery heat exchanger 614 may be in fluid communication with a path of the flow of exhaust gases 44 between the exhaust gas heat exchanger 46 and the exhaust outlet 45. In another embodiment a waste heat recovery heat exchanger 714 is in a path of the flow of exhaust gases 52 to the exhaust outlet 45. One of the waste heat recovery heat exchangers located in multiple flow paths of the reformer system 12 and optionally the exhaust gas heat exchanger 46 may be used directly in an organic Rankine cycle system integrated with the reformer system 12 in a waste heat recovery system (shown as 100 in FIG. 3).

Figure 3:
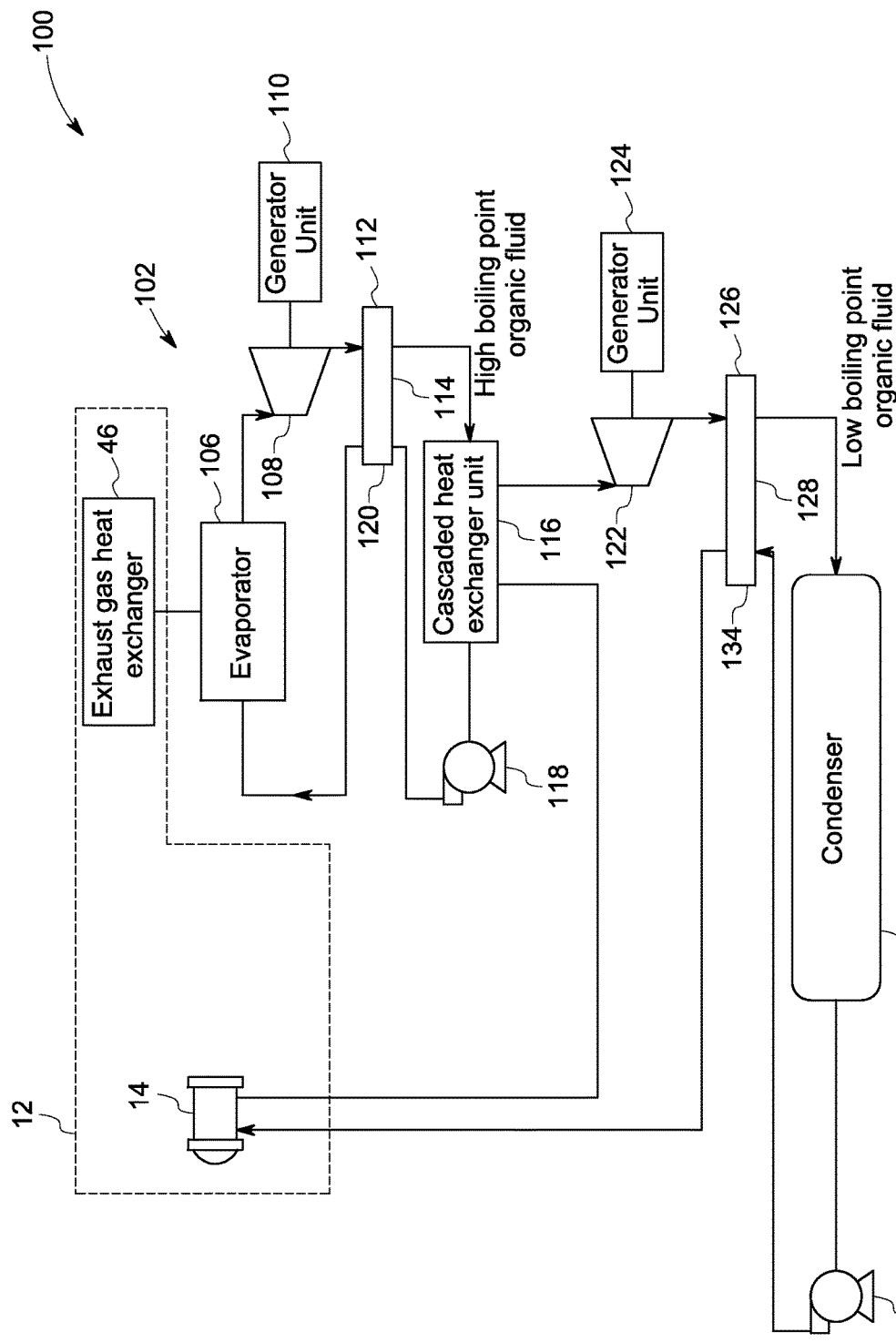
FIG. 3 is a diagrammatical representation of a recuperated waste heat recovery system having two integrated organic Rankine cycle systems in accordance with an embodiment of the present invention.

FIG. 3 is a diagrammatical representation of the waste heat recovery system 100 having at least one integrated organic Rankine cycle system (102, 104) in accordance with an embodiment of the present invention. The illustrated waste heat recovery system 100 includes a first organic Rankine cycle system 102 (top cycle) and a second organic Rankine cycle system 104 (bottom cycle). A first organic working fluid is circulated through the first organic Rankine cycle system 102. The first organic working fluid may include for example, cyclohexane, cyclopentane, thiophene, ketones, aromatics, or combinations thereof. The first organic Rankine cycle system 102 includes an evaporator 106 coupled to the exhaust gas heat exchanger 46 of the reformer system 12 (shown in FIG. 2). In one example, the temperature of the exhaust gases of the internal combustion engine 24 (shown in FIG. 2) may be in the temperature range of about 400 to 500 degrees Celsius. The evaporator 106 receives heat from the exhaust gas from the internal combustion engine 24 and generates a first organic working fluid vapor. The first organic working fluid vapor is passed through a first expander 108 (which in one example comprises a radial type expander) to drive a first generator unit 110. In other embodiments, the first expander 108 may be an axial type expander, impulse type expander, or high temperature screw type expander. In the illustrated embodiment, after passing through the first expander 108, the first organic working fluid vapor at a relatively lower pressure and lower temperature is passed through a hot side 112 of a recuperator 114 to a cascaded heat exchange unit 116. The first organic working fluid vapor is restored to its saturated state, or the superheat temperature is reduced before being fed to the cascaded heat exchange unit 116 wherein the first organic working fluid vapor is condensed into a liquid. A first pump 118 is used to pump the condensed liquid from the cascaded heat exchange unit 116 to the evaporator 16 via a cold side 120 of the recuperator 114. The condensed first working fluid is preheated before being fed to the evaporator 106. The cycle is then be repeated.

The cascaded heat exchange unit 116 is used both as a condenser for the first organic Rankine cycle system 102 and as evaporator for the second organic Rankine cycle system 104. A second organic working fluid is circulated through the second organic Rankine cycle system 104. The second organic working fluid may include for example, propane, butane, pentafluoro-propane, pentafluoro-butane, pentafluoro-polyether, oil, or combinations thereof. It should be noted herein that the list of first and second organic working fluids are not inclusive and other organic working fluids applicable to organic Rankine cycles are also envisaged. In certain other embodiments, the first or second organic working fluid includes a binary fluid. The binary fluid may include cyclohexane-propane, cyclohexane-butane, cyclopentane-butane, or cyclopentane-pentafluoropropane, for example. Cascaded heat exchange unit 116 may be coupled to any one or more of a plurality of the waste heat recovery heat exchangers 14 of the reformer system 12 (shown in FIG. 2). The temperature of the waste heat from the at least one waste heat recovery heat exchanger 14 may be in the range of about 300 degrees Celsius to about 700 degrees Celsius depending on the position in the reformer system 12. The cascaded heat exchange unit 116 receives heat from the first organic working fluid and generates a second organic working fluid vapor. The second organic working fluid vapor is passed through a second expander 122 (which in one example comprises a screw type compressor) to drive a second generator unit 124. In certain other exemplary embodiments, the second expander 122 may be a radial type expander, an axial type expander, or an impulse type expander. In certain other exemplary embodiments, the first expander 108 and the second expander 122 are coupled to the single generator unit 23 (shown in FIG. 1).

In an exemplary embodiment, neither of the first and second organic working fluids are expanded below the atmospheric pressure, and the boiling point temperature of the first organic working fluid is below the average temperature of the waste heat from the multiple waste heat recovery heat exchangers 14. After passing through the second expander 122, the second organic working fluid vapor at lower pressure and lower temperature is passed through a hot side 126 of a recuperator 128 to a condenser 130. In other words, the second organic working fluid vapor is restored to its saturated state, or the superheat temperature is reduced before being fed to the cascaded heat exchange unit 116. The second organic working fluid vapor is then condensed into a liquid. A pump 132 is used to pump the condensed working fluid from the condenser 130 to the plurality of waste heat recovery heat exchangers 14 (as shown in FIG. 2) via a cold side 134 of the recuperator 128. In other words, the condensed second working fluid is preheated before being fed to the plurality of waste heat recovery heat exchangers 14 (as shown in FIG. 2). The cycle may then be repeated.

Although, in the illustrated embodiment, two recuperators 114, 128 are provided respectively for the first organic Rankine cycle system 102 and the second Rankine cycle system 104, in certain other embodiments, one recuperator may be provided either for the first organic Rankine cycle system 102 or the second Rankine cycle system 104. The use of a recuperators in one or both of the high and low temperature loop of a cascading organic Rankine cycle provides a boost of the cycle net power output at a reduced specific cost.

The cascaded organic Rankine cycle system facilitates heat recovery over a temperature range that is too large for a single organic Rankine cycle system to accommodate efficiently. In one embodiment, the waste heat recovery heat exchangers 14 (shown in FIG. 2) are coupled along a single cooling loop in which the second organic working fluid is heated and partially evaporated. The illustrated layout of the waste heat recovery heat exchangers 14 (shown in FIG. 2) facilitates effective heat removal from the plurality of fluid communications in the reformer system 12 (shown in FIG. 2). This provides effective conversion of waste heat into electricity in the power generation system 10 (shown in FIG. 1).

Advantageously, the present invention enables the generation of additional electricity by utilizing the waste heat from the reformer system. Moreover, the integration of the reformer system with the waste heat recovery system and the internal combustion engine provides for an improved operation efficiency.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
a reformer system for producing syngas for an internal combustion engine, the reformer system comprising a reforming unit comprising a catalyst for thermochemical conversion of a first portion of a hydrocarbon fuel to the syngas; and
a waste heat recovery system comprising at least one organic Rankine cycle flow path of working fluid, at least one waste heat recovery exchanger for extracting waste heat located in a flow path of the reformer system, and at least one evaporator for using the extracted waste heat for heating the working fluid.

2. The power generation system of claim 1, further comprising a first waste heat recovery heat exchanger located in a fluid communication path carrying the syngas out of the reforming unit.

3. The power generation system of claim 2, further comprising a second waste heat recovery heat exchanger located in a fluid communication path carrying the syngas flowing out of the first waste heat recovery heat exchanger.

4. The power generation system of claim 3, further comprising a third waste heat recovery heat exchanger located in fluid communication path carrying the syngas flowing out of the second waste heat recovery heat exchanger.

5. The power generation system of claim 4, further comprising a fourth waste heat recovery heat exchanger located in fluid communication path carrying the syngas flowing out of the third waste heat recovery heat exchanger.

6. The power generation system of claim 1, further comprising an exhaust gas heat exchanger located in a fluid communication path carrying the exhaust gas from the internal combustion engine to an exhaust outlet.

7. The power generation system of claim 6, further comprising fifth and sixth waste heat recovery heat exchangers located on either side of the exhaust gas heat exchanger located in a fluid communication path carrying the exhaust gas from the internal combustion engine to the exhaust outlet.

8. The power generation system of claim 6, further a seventh waste heat recovery exchanger located in a fluid communication path carrying the exhaust gas from the internal combustion engine and the exhaust outlet.

9. A waste heat recovery system comprising:
an reformer system comprising at least one waste heat recovery heat exchanger for extracting waste heat located in a flow path of the reformer system; and
at least one organic Rankine cycle system integrated with the reformer system,
wherein the at least one organic Rankine cycle system comprises an evaporator configured to at least partially evaporate and/or to superheat a working fluid using the waste heat recovered from the reformer system.

10. The waste heat recovery system of claim 9, further comprising a first organic Rankine cycle system cascaded with a second organic Rankine cycle system.

11. A reformer system comprising:
a reforming unit for producing a syngas for an internal combustion engine; and
a plurality of waste heat recovery heat exchangers for extracting waste heat located in a plurality of flow paths of the reformer system and using the extracted waste heat to at least partially evaporate or superheat a working fluid of at least one Rankine cycle system for power generation.

12. The reformer system of claim 11; wherein the reforming unit comprises a catalyst for thermochemical conversion of a mixture of a first portion of a hydrocarbon fuel along with a flow of steam and a flow of air to the syngas.

13. The reformer system of claim 12, wherein the reforming unit utilizes a flow of exhaust gases 38 along with the flow of air in addition to the mixture of the first portion of a hydrocarbon fuel along with the flow of steam.

14. The reformer system of claim 11; further comprising first and second waste heat recovery heat exchangers located in a fluid communication path carrying the syngas out of the reforming unit.

15. The reformer system of claim 14; further comprising third and fourth waste heat recovery heat exchangers located in series in a fluid communication path carrying the syngas from the first and second waste heat recovery heat exchangers to the internal combustion engine.

16. The reformer system of claim 11; further comprising a gas mixer for mixing a second portion of the hydrocarbon fuel with the syngas supplied from the reforming unit along with air prior to supplying the mixture to the internal combustion engine.

17. The reformer system of claim 11, further comprising fifth and sixth waste heat recovery heat exchangers located on either side of an exhaust gas heat exchanger.

* * * * *